July 28, 1925.
J. D. MULVEHILL
INDICATOR
Filed March 5, 1925
1,547,673
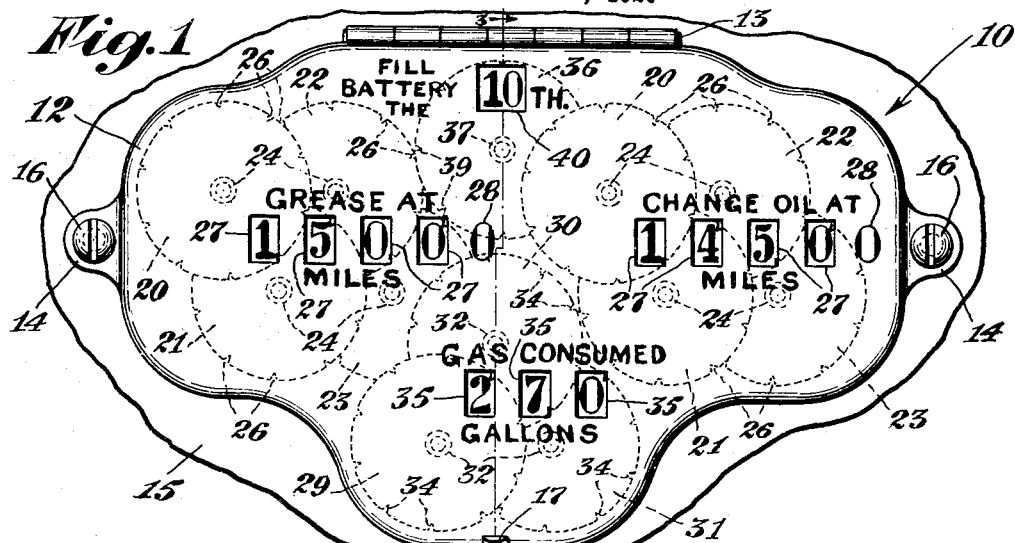
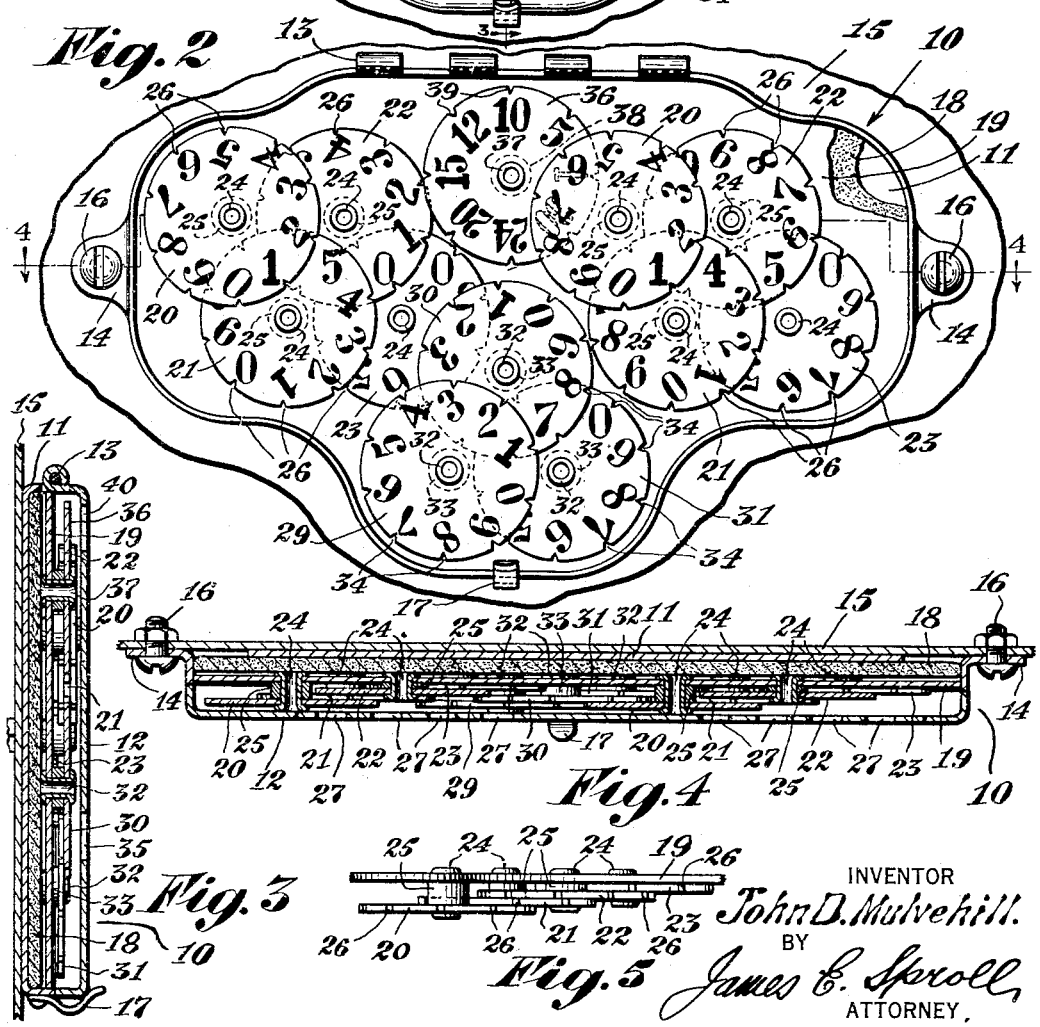

Patented July 28, 1925.

1,547,673

UNITED STATES PATENT OFFICE.

JOHN D. MULVEHILL, OF SEATTLE, WASHINGTON.

INDICATOR.

Application filed March 5, 1925. Serial No. 13,415.

*To all whom it may concern:*

Be it known that I, JOHN D. MULVEHILL, a citizen of the United States, residing at Seattle, in the county of King and State of Washington, have invented certain new and useful Improvements in Indicators, of which the following is a specification.

The primary aim and fundamental object of the present invention is the provision of an indicator designed to be fixedly secured to the dash board of an automotive vehicle to indicate thereat and thereon at what odometer readings the vehicle grease cups should be filled or otherwise lubricated, the vehicle crank case oil changed, the number of gallons of fluid fuel purchased or consumed by the vehicle engine during a predetermined period or for a selected mileage, and upon what dates the vehicle storage battery should be supplied with distilled water.

With these and other ends in view the invention essentially resides in the provision of an indicator embodying a relatively shallow sectional casing of curvilinear formation comprising a rear or base section designed to be rigidly secured to a suitable support, and a front or cover section hingedly connected thereto designed to swing upwardly and forwardly therefrom, to permit of the ready and rapid adjustment or setting of the several indicating mechanisms housed within said rear section, and to be retained in a normally closed position upon and relative to said rear section by restrainingly engaging means carried thereby; a readily insertible and removable layer of resilient material, such as felt or the like, of curvilinear formation, designed to snugly fit within and abut the vertical rear wall of the rear section, aforesaid, to function as a cushion for and to maintain the several indicating mechanisms housed within said casing in proper operative and relative positions therein; a readily insertible and removable backing or support, preferably of flexible material, such as celluloid or the like, also of curvilinear formation and designed to snugly fit within the rear section, as aforesaid, and to substantially abut the forward or outer face of said layer of resilient material; a plurality of mileage indicating mechanisms, to indicate the odometer readings for greasing and changing of oil, each of which mechanisms comprises four independently and manually operable numeral bearing disks rotatively mounted upon said backing in overlapped and staggered relation with respect to each other, and one fixed numeral upon the front face of the front section, aforesaid, whereby an indication of five figures may be obtained; a fluid fuel consumption recording mechanism partially interposed between the mileage indicating mechanisms, as aforesaid, to record the number of gallons of fluid fuel consumed or purchased during a predetermined period or for a selected mileage, which comprises three independently and manually operable numeral bearing disks rotatively mounted upon the backing, as aforesaid, in overlapped and staggered relation with respect to each other, whereby an indication of three figures may be obtained; a battery filling date indicating mechanism substantially interposed between the mileage indicating mechanisms, aforementioned, which consists of one manually operable numeral bearing disk rotatively mounted upon said backing; and a series of correlated and spaced aligned windows formed in the front section of the sectional casing, as aforesaid, for viewing the numerals of selected or predetermined settings of each of the several indicating mechanisms housed within said sectional casing.

The invention further resides in the provision of an indicator, that is simple and durable in construction, that may be rapidly and readily set or adjusted, that is efficient and reliable in use, and that may be manufactured at a comparatively low cost.

The invention still further resides in the novel construction, combination, adaptation, and arrangement of parts, as will hereinafter be more fully described and succinctly defined in the claims hereunto appended.

Referring now to the accompanying drawings, wherein is illustrated the specific form of the invention, as at present preferred:—

Figure 1 is a front elevation of an indicator fabricated in accordance with the invention, as it would appear when operatively secured upon the dash board of an automotive vehicle.

Fig. 2 is an elevation of the indicator with the hinged front or cover section thereof removed, to more clearly illustrate the several indicating mechanisms housed therein, and with certain other parts broken away.

Fig. 3 is a vertical transverse section taken through 3—3 of Fig. 1.

Fig. 4 is a horizontal longitudinal section taken through 4—4 of Fig. 2, with certain parts of the front section broken away, and Fig. 5 is a fragmentary top edge view of the backing and correlated indicating mechanisms thereof removed from the associated indicator casing.

In the drawings and in the following description, I have elected to illustrate and describe the invention, as embodying mileage indicating mechanisms for greasing and oiling, each consisting of four disks; a fluid fuel consumption recording mechanism consisting of three disks; and a battery filling date indicating mechanism consisting of one disk, with the correlated windows therefor, but, manifestly any number of disks may be employed in such mechanisms, without departing from the invention or the benefits derivable therefrom, the present showing being merely by way of illustration.

In the drawings and in the following description similar reference numerals or characters designate similar parts throughout the several views.

The numeral 10 designates a relatively shallow sectional casing of curvilinear formation comprising a rear section 11 and a front or cover section 12 hingedly connected thereto along the upper edge thereof, as indicated at 13. The rear or base section 11 and the front or cover section 12 are preferably formed by pressing the same from sheets of suitable material, in order to provide the sectional casing 10 with the curvilinear contour, as shown. The rear section 11 is provided at the ends thereof with substantially medially disposed securing lugs 14, which are cut from the material of the back vertical wall thereof, and bent outwardly therefrom in longitudinal prolongation thereto, as shown more clearly in Fig. 4. The rear or base section 11 is designed to be mounted upon a flat surface, such as indicated by the numeral 15, which may be the dash board of an automotive vehicle, and to be rigidly secured thereto, as by screws or bolts 16. The rear section 11 and the front section 12 are normally retained in closed relation, with respect to each other, by a resilient finger or flat spring member 17 fixedly secured at the rear or inner end thereof to the lower edge or wall of the rear section 11 and which extends outwardly therefrom in perpendicular relation thereto, to thereby restrainingly engage the lower edge or wall of the front section 12, as more clearly shown in Fig. 3, such a construction permits of the rapid and ready opening or closing of the sectional casing 10, as will be manifest and apparent.

Seated and snugly fitting within the rear section 11 is a cushion or layer 18, of felt or other suitable material of curvilinear formation and similarly seated and snugly fitting within said rear section 11 is an insertible and removable backing or wall 19, also of curvilinear formation, preferably formed of flexible material, such as celluloid or the like.

Mounted in spaced relation, upon the outer face of the backing 19, are mileage indicating mechanisms, to indicate at what odometer readings the vehicle should be greased or otherwise lubricated, also at what odometer readings the vehicle crank case oil should be changed, and inasmuch as such indicating mechanisms are identical in construction, a description of one will suffice for both.

The indicating mechanisms aforesaid, comprise independently and manually operable numeral bearing disks, or index members 20 to 23, inclusive, which are rotatively mounted, as by eyelets or hollow rivets 24, upon the backing 19, in overlapped and staggered spaced relation with respect to each other and maintained in successive spaced relation with respect to the backing 19, by washers or spacer members 25, interposed therebetween, as shown more clearly in Fig. 5. The respective peripheries of the numeral bearing disks 20 to 23, inclusive, are provided with notches 26, wherein the index finger nail of the operator may be readily inserted, thereby facilitating and expediting the manual rotation and manipulation of said disks, to thus obtain the desired or selected settings therewith.

As shown in Figs. 1 and 2, the numerals upon the numeral bearing disks 20 to 23, inclusive, are arranged successively and in such a manner to so dispose the numerals of any selected or predetermined setting in contiguity and in alignment or common horizontal plane, to form and constitute a reading line thereof, alternate disks being disposed above and below such reading line. Windows 27, are cut and provided within the vertical forward wall of the front section 12, in uniformly spaced and aligned relation and are disposed within said wall in the plane of the reading line, aforesaid, and in the vertical planes of the numerals of the setting, as aforesaid, whereby a clear and unobstructed view of the individual numerals thereof and the numerical setting or group formed thereby is readily obtained thereat.

To provide the capacity of five figures, by the use of only four disks, one fixed zero is placed upon the outer face of the front section 12, to the right of the windows 27, in spaced and aligned relation with respect thereto, as indicated at 28. The result of such arrangement is that the numeral on the extreme left represents tens of thousands, the next numeral thousands, and the next numeral hundreds, while the two figures to the right represent tens. Manifestly therefore, by the use of the one fixed zero 28, only tens can be denoted by the two right-hand figures, which is a sufficiently close adjustment for all practical purposes.

Mounted upon the outer face of the backing 19 and partially interposed between the mileage indicating mechanisms hereinbefore described, is a fluid fuel consumption recording mechanism, to record the number of gallons of fluid fuel consumed or used during a predetermined period or for a selected mileage, which comprises independently and manually operable numeral bearing disks or index members 29 to 31, inclusive, rotatively mounted by eyelets 32 upon the backing 19 in overlapped and staggered spaced relation with respect to each other, and maintained in successive spaced relation with respect to said backing 19, by washers 33 interposed therebetween, as shown more clearly in Fig. 3. The respective peripheries of the disks 29 to 31, inclusive, are provided with notches 34 to expedite the manual rotation and adjustment thereof for a predetermined and selected setting.

As shown in Figs. 1 and 2, the numerals upon the disks 29 to 31, inclusive, are arranged successively and in such a manner to so dispose the numerals of any selected or predetermined setting in contiguity and in alignment or common horizontal plane, to form and constitute a line thereof, alternate disks being disposed above and below such reading line. Windows 35 are cut and provided within the vertical forward wall of the front section 12, in uniformly spaced and aligned relation and are disposed within said wall in the plane of the reading line aforesaid, and in the vertical planes of the numerals of the setting, as aforesaid, whereby a clear and unobstructed view of the individual numerals thereof and the numerical setting or group formed thereby is readily obtained thereat. The result of such arrangement is that the numeral on the extreme left represents hundreds, the next numeral tens, while the figure to the right represents units, which is a sufficiently close adjustment for all practical purposes.

To indicate the filling of the vehicle storage battery, which should be on a time basis rather than a mileage basis, a numeral disk or index member 36 is shown as substantially interposed between the mileage indicating mechanisms herein described, and in the present construction is rotatively mounted by an eyelet or hollow rivet 37 upon the forward face of the backing 19 and spaced therefrom by a washer 38. The periphery of the disk 36 is notched, as at 39, to facilitate the rotation or adjustment thereof. The disk 36 is also provided with numerals denoting certain days of the month. A window 40 is cut and provided within the vertical forward wall of the front section 12, substantially midway the length and adjacent to the upper edge thereof, opposite which the desired numerals may be brought by manipulating or rotating the disk 36. Manifestly therefore, when the battery is given attention the disk 37 may be set or adjusted to indicate the next day of the month upon which the duty should be performed.

It will be noted by referring to the drawings, that the upper disks, or disks above the reading lines of the mileage indicating mechanisms and the fluid fuel recording mechanism, are identical in construction and numerical arrangement and similarly, the lower disks, or disks below the reading lines of said indicating or recording mechanisms are identical in construction and numerical arrangement, thus rendering said disks readily interchangeable and reducing the manufacturing cost of the same to the minimum. Further, while I have shown and described the several manually operable and numeral bearing disks of the indicator, as rotatively mounted upon the backing 19, I desire to have it understood that I do not wish to confine or restrict the invention to the mounting of said disks in the manner herein shown and described, as the same may be rotatively mounted in a similar manner upon the inner face of the front section 12, to so perform the designed functions, as efficiently, as in the manner hereinbefore set forth.

By referring to Figs. 3 and 4 of the drawings, it will be apparent and obvious that the cushion or layer of felt 18, due to its resilient qualities and properties, will serve to maintain and retain the numeral bearing disks of the several indicating mechanisms in close contiguity to the correlated windows thereof, to thereby provide for the vehicle operator a clear and unobstructed view of the numerals upon said disks brought into registration therewith.

In initiating the use of the device with a new car the numeral bearing disks of the mileage indicating mechanisms may be manipulated to show through the correlated windows thereof the odometer readings at which it is desired to perform the first greasing operation, and the first change of crank case oil, which operations should be carried out with a new car at a less interval than with an old car. As the car upon which the device is mounted becomes "worked-in" the intervals between such operations may be lengthened, and the indicating mechanisms may be set at any odometer readings at which it is desired to carry out the next greasing operation and the operation of changing the crank case oil, the settings being made whenever the car is greased and the oil changed. The greasing and oil changing mechanisms are designed to carry the indications through with the odometer readings up to the numbers 99,990, with the arrangement of numerals shown, utilizing but four numeral disks for each of said mechanisms, and because of the independent operation of said disks the settings thereof may be made with perfect freedom to indicate the greasing and oil changing intervals.

If desired the indicating mechanisms may be set at the odometer readings when the car is greased or when the oil is changed, in which event the same would serve as memorandums as to when such operations were performed, and the time for the succeeding greasing and oil changing operations would be arrived at by subtracting the indicator readings from the odometer reading.

While I have herein shown and described the invention with sufficient detail to enable those skilled in the art to understand the mode of construction and the principles involved, it is to be understood that there is no intentional limitation herein to the specific form and precise details of construction of the invention shown and described, except as expressly defined by the appended claims, and that various modifications of said construction may be resorted to without departing from the invention or the benefits derivable therefrom. I also desire it to be understood that certain features of the invention herein shown and described may be employed in other combinations than those herein shown.

Having thus fully described my invention, what I claim as new and desire to secure by Letters Patent of the United States of America is:—

1. In an indicator, in combination, a relatively shallow casing, a backing snugly fitting within said casing, a plurality of independently and manually adjustable numeral bearing disks rotatively mounted upon said backing in overlapped and staggered relation, windows disposed within the forward wall of said casing in spaced aligned relation for viewing the numerals upon said disks, alternate disks being disposed above and below the line of said windows, a fixed numeral borne by the outer face of the forward wall of said casing in spaced aligned relation with said windows, and means interposed between said backing and said casing to maintain said disks in contiguous relation with the forward wall of said casing.

2. In an indicator, in combination, a relatively shallow sectional casing of curvilinear contour, comprising complemental hingedly connected front and rear sections, an insertible and removable backing of curvilinear contour snugly fitting within said rear section, a plurality of independently and manually adjustable numeral bearing disks rotatively mounted upon said backing in overlapped and staggered relation thereon having the peripheries thereof notched, windows disposed within the forward wall of said front section in spaced aligned relation for viewing the numerals upon said disks, alternate disks being disposed above and below the line of said windows, resilient means interposed between said backing and the vertical rear wall of said rear section to maintain said disks in contiguous relation to the said windows, and means to normally maintain the said front and rear sections in closed relation.

In testimony whereof I affix my signature.

JOHN D. MULVEHILL.